US012615154B2

(12) United States Patent
Mossler et al.

(10) Patent No.: US 12,615,154 B2
(45) Date of Patent: Apr. 28, 2026

(54) TECHNIQUES TO CONTROL APPLETS FOR CONTACTLESS CARDS

(71) Applicant: Capital One Services, LLC, McLean, VA (US)

(72) Inventors: Lara Mossler, Farmville, VA (US); Madhavan Chandran, Glen Allen, VA (US)

(73) Assignee: Capital One Services, LLC., McLean, VA (US)

( * ) Notice: Subject to any disclaimer, the term of this patent is extended or adjusted under 35 U.S.C. 154(b) by 0 days.

(21) Appl. No.: 18/631,792

(22) Filed: Apr. 10, 2024

(65) Prior Publication Data

US 2024/0259207 A1    Aug. 1, 2024

Related U.S. Application Data

(63) Continuation of application No. 17/317,324, filed on May 11, 2021, now Pat. No. 12,003,644, which is a
(Continued)

(51) Int. Cl.
*H04L 9/32* (2006.01)
*G06Q 20/32* (2012.01)
(Continued)

(52) U.S. Cl.
CPC ......... *H04L 9/3234* (2013.01); *G06Q 20/341* (2013.01); *G06Q 20/343* (2013.01);
(Continued)

(58) Field of Classification Search
CPC .. G06Q 20/352; G06Q 20/343; G06Q 20/341; G06Q 20/3563; G06Q 20/3278; H04W 4/80; H04W 12/06; H04W 12/08; G06F 21/44; H04L 63/0435; H04L 63/0853; H04L 9/32; H04L 9/3226; H04L 9/3234
See application file for complete search history.

(56) References Cited

U.S. PATENT DOCUMENTS

| | | | |
|---|---|---|---|
| 5,590,038 A | 12/1996 | Pitroda | |
| 5,666,415 A | 9/1997 | Kaufman | |

(Continued)

FOREIGN PATENT DOCUMENTS

| | | |
|---|---|---|
| CN | 101192295 A | 6/2008 |
| CN | 106227563 A | 12/2016 |

(Continued)

OTHER PUBLICATIONS

Author Unknown, "Global expansion of card tapping mobile OTP for security and convenience is imminent," Jun. 28, 2022, website: https://www.swidch.com/blogs/card-tapping-motp-blog.
(Continued)

*Primary Examiner* — Jeremy S Duffield
(74) *Attorney, Agent, or Firm* — KDW FIRM PLLC

(57) ABSTRACT

Various embodiments are generally directed to techniques provide and control applets for transaction cards. More specifically, embodiments discussed here include permitting or denying applets of transaction cards based on whether they are enabled or disabled. Embodiments may also include enabling and disable applets for transaction cards.

20 Claims, 10 Drawing Sheets

Related U.S. Application Data continuation of application No. 16/731,009, filed on Dec. 30, 2019, now Pat. No. 11,038,688.

(51) Int. Cl.
| | |
|---|---|
| *G06Q 20/34* | (2012.01) |
| *H04L 9/40* | (2022.01) |

(52) U.S. Cl.
CPC ....... *G06Q 20/352* (2013.01); *G06Q 20/3563* (2013.01); *H04L 63/0435* (2013.01); *H04L 63/0853* (2013.01); *G06Q 20/3278* (2013.01); *H04L 9/3226* (2013.01)

(56) References Cited

U.S. PATENT DOCUMENTS

| | | | |
|---|---|---|---|
| 6,199,114 | B1 | 3/2001 | White |
| 6,324,271 | B1 | 11/2001 | Sawyer |
| 6,367,011 | B1 | 4/2002 | Lee |
| 6,572,015 | B1 | 6/2003 | Norton |
| 7,252,242 | B2 | 8/2007 | Ho |
| 7,270,276 | B2 | 9/2007 | Vayssiere |
| 7,287,692 | B1 | 10/2007 | Patel |
| 7,374,099 | B2 | 5/2008 | de Jong |
| 7,527,208 | B2 | 5/2009 | Hammad |
| 7,568,631 | B2 | 8/2009 | Gibbs |
| 7,584,153 | B2 | 9/2009 | Brown |
| 7,628,322 | B2 | 12/2009 | Holtmanns |
| 7,793,851 | B2 | 9/2010 | Mullen |
| 7,801,799 | B1 | 9/2010 | Brake, Jr. |
| 7,908,216 | B1 | 3/2011 | Davis |
| 7,922,082 | B2 | 4/2011 | Muscato |
| 8,010,405 | B1 | 8/2011 | Bortolin |
| 8,074,877 | B2 | 12/2011 | Mullen |
| 8,082,450 | B2 | 12/2011 | Frey |
| 8,108,687 | B2 | 1/2012 | Ellis |
| 8,186,602 | B2 | 5/2012 | Itay |
| 8,196,131 | B1 | 6/2012 | Von Behren |
| 8,249,654 | B1 | 8/2012 | Zhu |
| 8,276,814 | B1 | 10/2012 | Davis |
| 8,332,272 | B2 | 12/2012 | Fisher |
| 8,346,670 | B2 | 1/2013 | Hasson |
| 8,511,547 | B2 | 8/2013 | Rans |
| 8,519,822 | B2 | 8/2013 | Riegebauer |
| 8,750,514 | B2 | 6/2014 | Gallo |
| 8,870,081 | B2 | 10/2014 | Olson |
| 9,038,893 | B2 | 5/2015 | Kirkham |
| 9,129,199 | B2 | 9/2015 | Spodak |
| 9,183,490 | B2 | 11/2015 | Moreton |
| 9,275,325 | B2 | 3/2016 | Newcombe |
| 9,286,606 | B2 | 3/2016 | Diamond |
| 9,306,753 | B1 | 4/2016 | Vandervort |
| 9,501,776 | B2 | 11/2016 | Martin |
| 9,710,744 | B2 | 7/2017 | Wurmfeld |
| 9,949,065 | B1 | 4/2018 | Zarakas |
| 9,965,632 | B2 | 5/2018 | Zarakas |
| 9,965,911 | B2 | 5/2018 | Wishne |
| 9,977,890 | B2 | 5/2018 | Alberti |
| 9,978,056 | B2 | 5/2018 | Seo |
| 9,978,058 | B2 | 5/2018 | Wurmfeld |
| 9,990,795 | B2 | 6/2018 | Wurmfeld |
| 10,007,873 | B2 | 6/2018 | Heo |
| 10,013,693 | B2 | 7/2018 | Wyatt |
| 10,121,130 | B2 | 11/2018 | Pinski |
| 10,210,505 | B2 | 2/2019 | Zarakas |
| 10,242,368 | B1 | 3/2019 | Poole |
| 10,296,910 | B1 | 5/2019 | Templeton |
| 10,332,102 | B2 | 6/2019 | Zarakas |
| 10,360,557 | B2 | 7/2019 | Locke |
| 10,380,471 | B2 | 8/2019 | Locke |
| 10,395,244 | B1 | 8/2019 | Mossler |
| 10,453,054 | B2 | 10/2019 | Zarakas |
| 10,474,941 | B2 | 11/2019 | Wurmfeld |
| 10,475,027 | B2 | 11/2019 | Guise |
| 10,482,453 | B2 | 11/2019 | Zarakas |
| 10,482,457 | B2 | 11/2019 | Poole |
| 10,489,774 | B2 | 11/2019 | Zarakas |
| 10,489,781 | B1 | 11/2019 | Osborn |
| 10,510,070 | B2 | 12/2019 | Wurmfeld |
| 10,515,361 | B2 | 12/2019 | Zarakas |
| 10,535,068 | B2 | 1/2020 | Locke |
| 10,546,444 | B2 | 1/2020 | Osborn |
| 10,581,611 | B1 | 3/2020 | Osborn |
| 10,664,830 | B1 | 5/2020 | Rule |
| 10,685,349 | B2 | 6/2020 | Brickell |
| 10,797,882 | B2 | 10/2020 | Rule |
| 10,880,741 | B2 | 12/2020 | Zarakas |
| 10,909,525 | B1 | 2/2021 | Dhodapkar |
| 10,970,691 | B2 | 4/2021 | Koeppel |
| 10,984,416 | B2 | 4/2021 | Ilincic |
| 11,037,136 | B2 | 6/2021 | Rule |
| 11,062,098 | B1 | 7/2021 | Bergeron |
| 11,120,453 | B2 | 9/2021 | Rule |
| 11,138,593 | B1* | 10/2021 | Ho ..................... G06Q 20/382 |
| 11,138,605 | B2 | 10/2021 | Aabye |
| 11,176,540 | B2 | 11/2021 | Gupta |
| 11,188,908 | B2 | 11/2021 | Locke |
| 11,216,806 | B2 | 1/2022 | Mossler |
| 11,297,958 | B2 | 4/2022 | Vukich |
| 11,334,872 | B2 | 5/2022 | Phillips |
| 11,361,173 | B2 | 6/2022 | Edwards |
| 11,392,933 | B2 | 7/2022 | Mossler |
| 11,392,935 | B2 | 7/2022 | Suresh |
| 11,416,844 | B1 | 8/2022 | Osterkamp |
| 11,423,392 | B1 | 8/2022 | Ho |
| 11,443,292 | B2 | 9/2022 | Sherif |
| 11,444,770 | B2 | 9/2022 | Wieker |
| 11,461,764 | B2 | 10/2022 | Rule |
| 11,481,764 | B2 | 10/2022 | Shakkarwar |
| 11,521,213 | B2 | 12/2022 | Rule |
| 11,551,200 | B1 | 1/2023 | Cook |
| 11,556,918 | B2 | 1/2023 | Mestre |
| 11,615,395 | B2 | 3/2023 | McHugh |
| 11,777,933 | B2 | 10/2023 | Moreton |
| 2003/0220876 | A1 | 11/2003 | Burger |
| 2005/0156026 | A1 | 7/2005 | Ghosh |
| 2005/0228997 | A1 | 10/2005 | Bicker |
| 2005/0269402 | A1 | 12/2005 | Spitzer |
| 2007/0276765 | A1 | 11/2007 | Hazel |
| 2008/0082452 | A1 | 4/2008 | Wankmueller |
| 2008/0099552 | A1 | 5/2008 | Grillion |
| 2009/0055893 | A1* | 2/2009 | Manessis ........... G06Q 20/4016 726/2 |
| 2009/0143104 | A1 | 6/2009 | Loh |
| 2009/0235339 | A1 | 9/2009 | Mennes |
| 2009/0282264 | A1 | 11/2009 | Amiel |
| 2010/0198728 | A1* | 8/2010 | Aabye ................... G06Q 20/40 726/19 |
| 2010/0211504 | A1* | 8/2010 | Aabye ................. G06Q 20/204 455/41.1 |
| 2011/0113245 | A1 | 5/2011 | Varadarajan |
| 2011/0155801 | A1* | 6/2011 | Rowberry ......... G06Q 20/3572 235/379 |
| 2011/0161229 | A1* | 6/2011 | Mastrangelo ......... G06Q 20/10 235/380 |
| 2012/0143703 | A1 | 6/2012 | Wall |
| 2012/0149331 | A1* | 6/2012 | Wu ....................... H04W 4/60 455/411 |
| 2013/0030997 | A1 | 1/2013 | Spodak |
| 2013/0146657 | A1 | 6/2013 | Graef |
| 2013/0211937 | A1 | 8/2013 | Elbirt |
| 2013/0268811 | A1* | 10/2013 | Gibis ................... G07F 7/1016 714/49 |
| 2013/0311363 | A1 | 11/2013 | Ramaci |
| 2014/0040126 | A1* | 2/2014 | Andrews ........... G06Q 20/3572 705/41 |
| 2014/0074637 | A1 | 3/2014 | Hammad |
| 2014/0074655 | A1 | 3/2014 | Lim |
| 2014/0081785 | A1 | 3/2014 | Valadas Preto |
| 2014/0365377 | A1 | 12/2014 | Salama |
| 2015/0032635 | A1 | 1/2015 | Guise |
| 2015/0058213 | A1 | 2/2015 | Lee Kim-Koon et al. |
| 2015/0073983 | A1 | 3/2015 | Bartenstein |

(56) References Cited

U.S. PATENT DOCUMENTS

| | | | |
|---|---|---|---|
| 2015/0113271 A1 | 4/2015 | Jooste | |
| 2015/0134513 A1 | 5/2015 | Olson | |
| 2015/0199673 A1 | 7/2015 | Savolainen | |
| 2015/0199863 A1 | 7/2015 | Scoggins | |
| 2015/0254637 A1 | 9/2015 | Yang | |
| 2015/0317295 A1 | 11/2015 | Sherry | |
| 2015/0348022 A1 | 12/2015 | Khan et al. | |
| 2016/0078430 A1 | 3/2016 | Douglas | |
| 2016/0189143 A1 | 6/2016 | Koeppel | |
| 2016/0232523 A1* | 8/2016 | Venot | G06Q 20/3223 |
| 2016/0253651 A1 | 9/2016 | Park | |
| 2016/0277383 A1 | 9/2016 | Guyomarc'h | |
| 2016/0307189 A1 | 10/2016 | Zarakas | |
| 2016/0314472 A1 | 10/2016 | Ashfield | |
| 2016/0379217 A1 | 12/2016 | Hammad | |
| 2017/0017957 A1 | 1/2017 | Radu | |
| 2017/0039566 A1 | 2/2017 | Schipperheijn | |
| 2017/0068950 A1 | 3/2017 | Kwon | |
| 2017/0330173 A1 | 11/2017 | Woo | |
| 2018/0039987 A1 | 2/2018 | Molino | |
| 2018/0268132 A1 | 9/2018 | Buer | |
| 2018/0300716 A1 | 10/2018 | Carlson | |
| 2019/0172055 A1 | 6/2019 | Hale | |
| 2019/0303945 A1 | 10/2019 | Mitra | |
| 2019/0392424 A1 | 12/2019 | Wilson et al. | |
| 2020/0160341 A1* | 5/2020 | Habeeb | G06Q 20/409 |
| 2021/0004806 A1 | 1/2021 | Noe | |
| 2021/0158343 A1* | 5/2021 | Varns | G06Q 20/206 |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0055421 A1* | 2/2022 | Bill | B60C 23/0454 |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | |
|---|---|---|
| GB | 2516861 A | 2/2015 |
| GB | 2551907 A | 1/2018 |
| KR | 20150140132 A | 12/2015 |
| WO | 9910824 A1 | 3/1999 |
| WO | 0049586 A1 | 8/2000 |
| WO | 2013155562 A1 | 10/2013 |
| WO | 2015183818 A1 | 12/2015 |
| WO | 2017047855 A1 | 3/2017 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

EMVCo, LLC, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

EMVCo, LLC, "EMV Card Personalisation Specification," Aug. 1, 2021, retrieved from the Internet URL: https://www.emvco.com/specification/?post_id=12467, 114 pages.

EMVCo, LLC, "EMV Card Personalization Specification," Specification version 1.0, (2003) 81 pages.

EMVCo, LLC, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_2016080902325 . . . , 52 pages.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

100

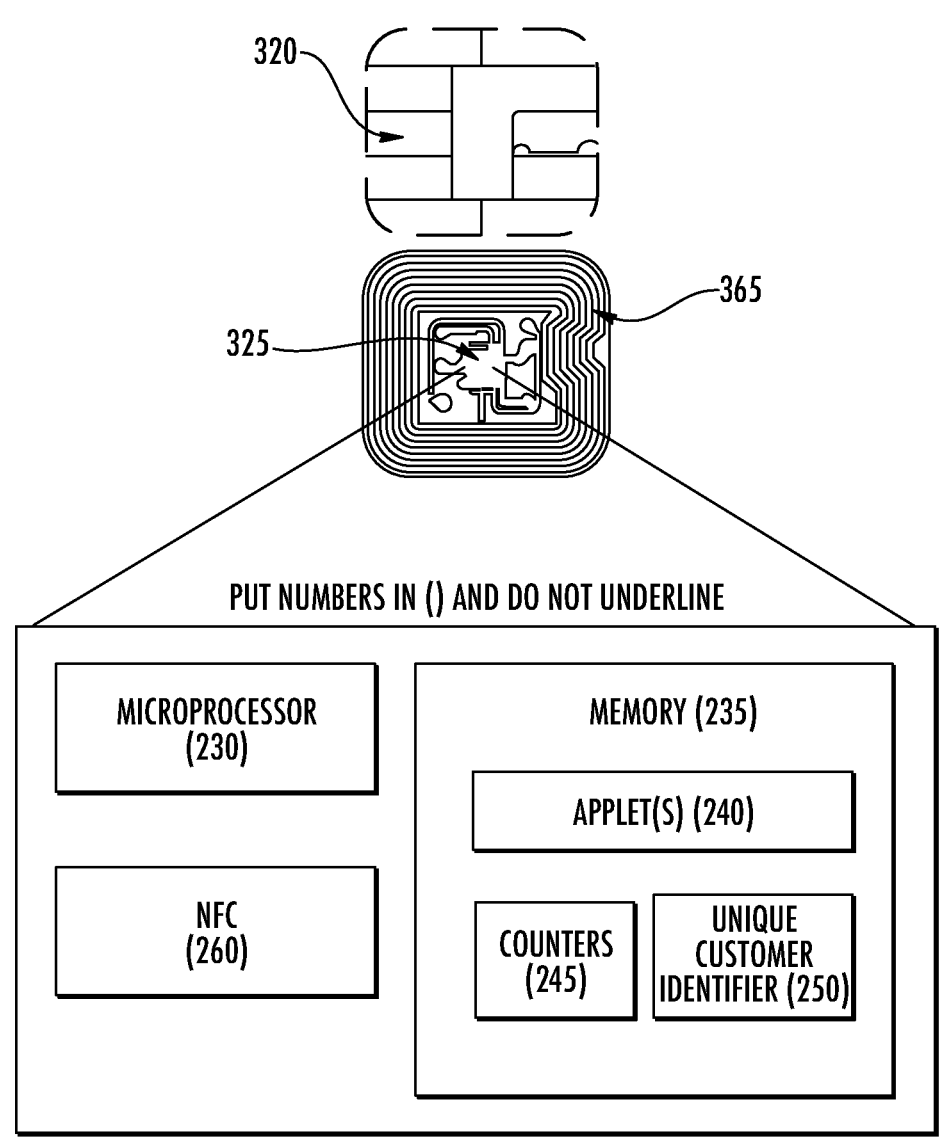
FIG. *2B*

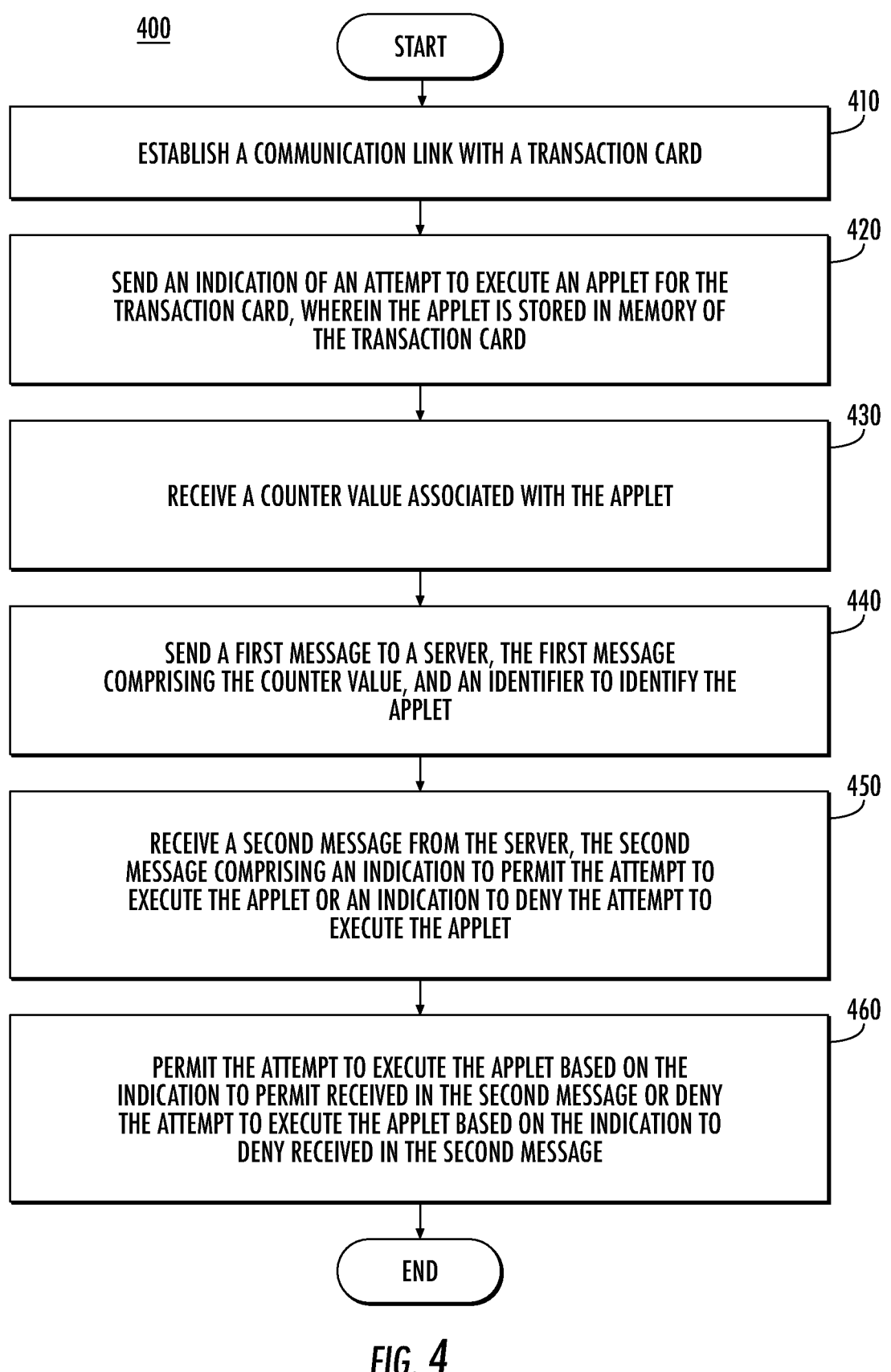

400

START

410
ESTABLISH A COMMUNICATION LINK WITH A TRANSACTION CARD

420
SEND AN INDICATION OF AN ATTEMPT TO EXECUTE AN APPLET FOR THE TRANSACTION CARD, WHEREIN THE APPLET IS STORED IN MEMORY OF THE TRANSACTION CARD

430
RECEIVE A COUNTER VALUE ASSOCIATED WITH THE APPLET

440
SEND A FIRST MESSAGE TO A SERVER, THE FIRST MESSAGE COMPRISING THE COUNTER VALUE, AND AN IDENTIFIER TO IDENTIFY THE APPLET

450
RECEIVE A SECOND MESSAGE FROM THE SERVER, THE SECOND MESSAGE COMPRISING AN INDICATION TO PERMIT THE ATTEMPT TO EXECUTE THE APPLET OR AN INDICATION TO DENY THE ATTEMPT TO EXECUTE THE APPLET

460
PERMIT THE ATTEMPT TO EXECUTE THE APPLET BASED ON THE INDICATION TO PERMIT RECEIVED IN THE SECOND MESSAGE OR DENY THE ATTEMPT TO EXECUTE THE APPLET BASED ON THE INDICATION TO DENY RECEIVED IN THE SECOND MESSAGE

END

FIG. 4

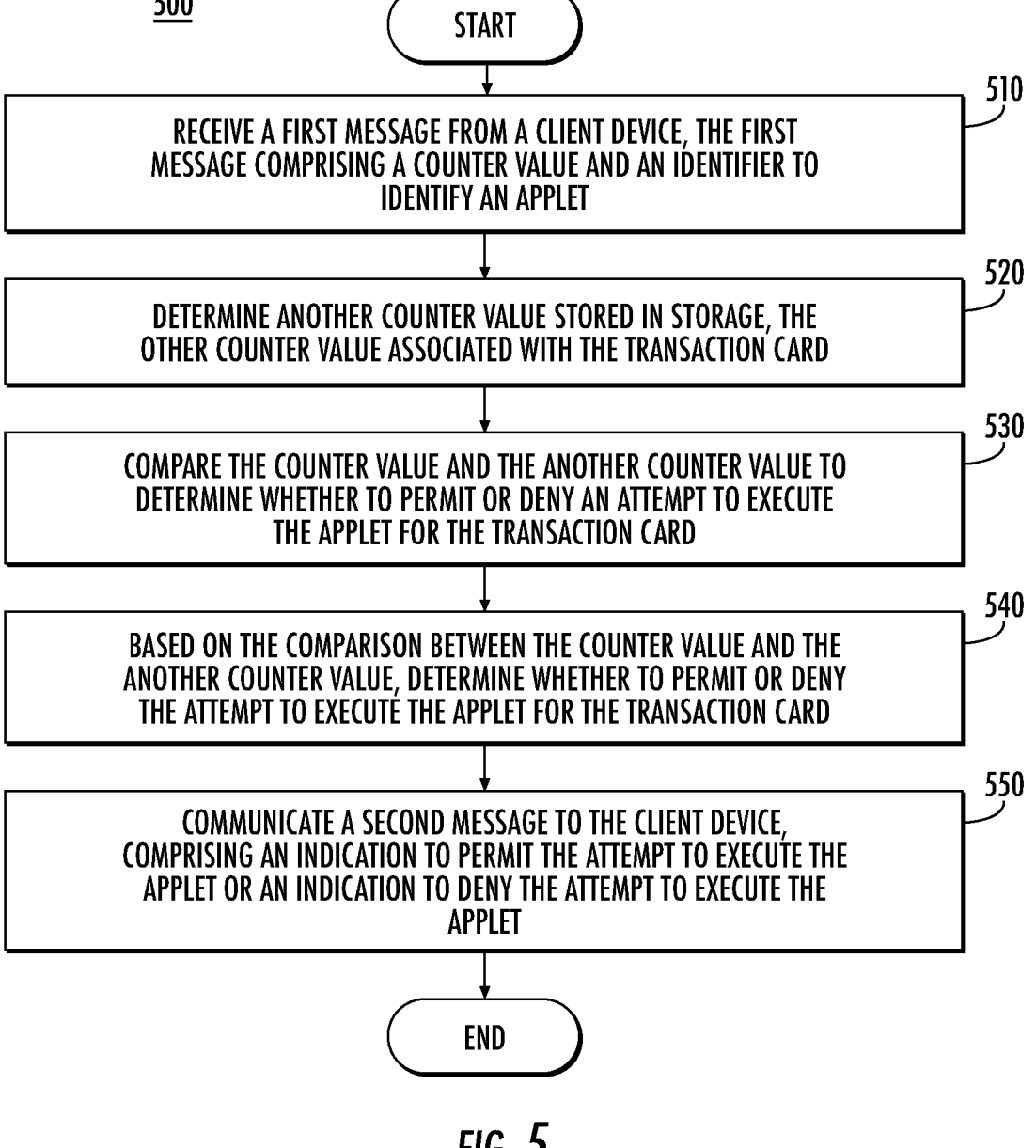

500

START

RECEIVE A FIRST MESSAGE FROM A CLIENT DEVICE, THE FIRST MESSAGE COMPRISING A COUNTER VALUE AND AN IDENTIFIER TO IDENTIFY AN APPLET          510

DETERMINE ANOTHER COUNTER VALUE STORED IN STORAGE, THE OTHER COUNTER VALUE ASSOCIATED WITH THE TRANSACTION CARD          520

COMPARE THE COUNTER VALUE AND THE ANOTHER COUNTER VALUE TO DETERMINE WHETHER TO PERMIT OR DENY AN ATTEMPT TO EXECUTE THE APPLET FOR THE TRANSACTION CARD          530

BASED ON THE COMPARISON BETWEEN THE COUNTER VALUE AND THE ANOTHER COUNTER VALUE, DETERMINE WHETHER TO PERMIT OR DENY THE ATTEMPT TO EXECUTE THE APPLET FOR THE TRANSACTION CARD          540

COMMUNICATE A SECOND MESSAGE TO THE CLIENT DEVICE, COMPRISING AN INDICATION TO PERMIT THE ATTEMPT TO EXECUTE THE APPLET OR AN INDICATION TO DENY THE ATTEMPT TO EXECUTE THE APPLET          550

END

FIG. 5

_700_
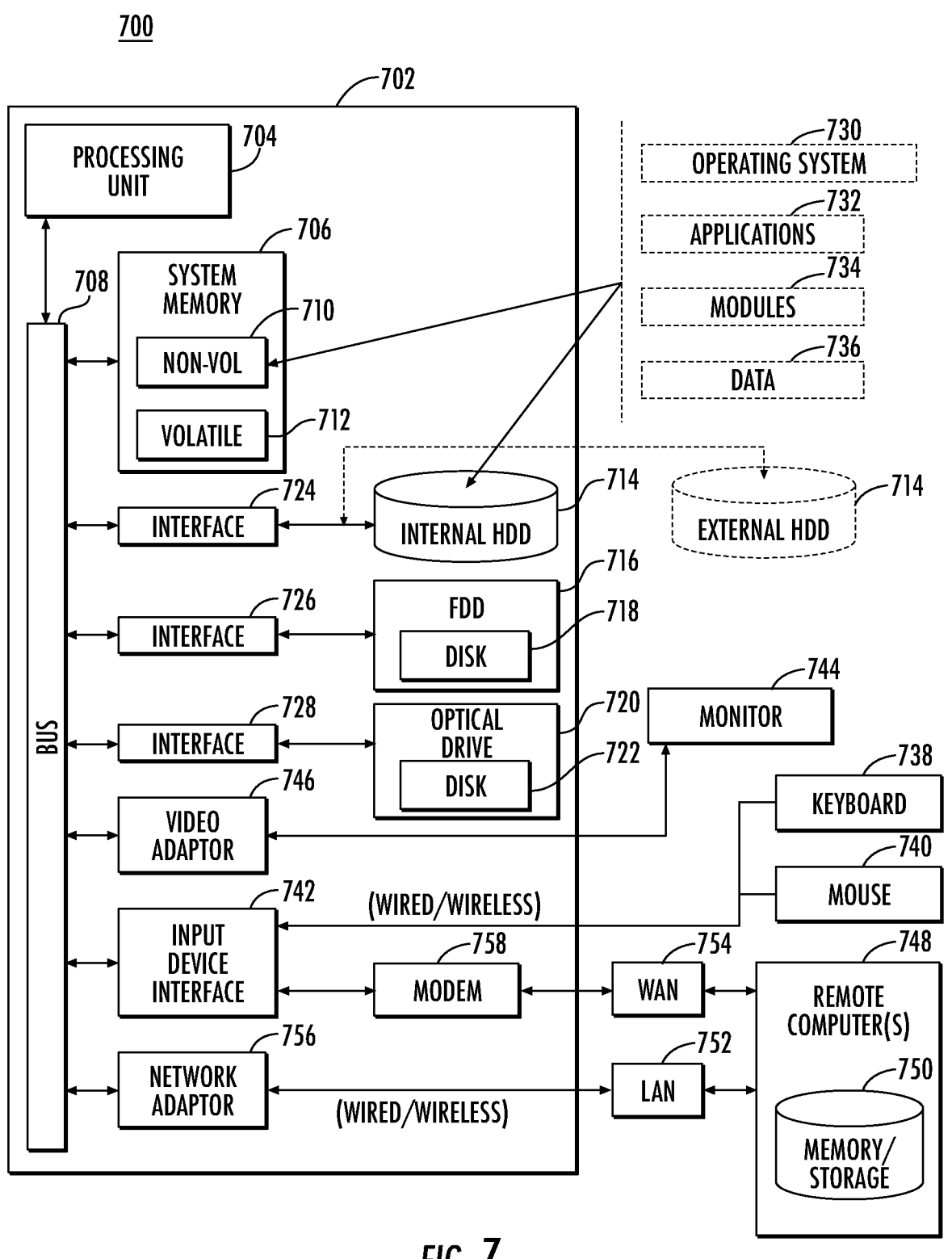
_FIG. 7_

TECHNIQUES TO CONTROL APPLETS FOR CONTACTLESS CARDS

CROSS-REFERENCE TO RELATED APPLICATIONS

This application is a continuation of U.S. patent application Ser. No. 17/317,324 filed on May 11, 2021, which is a continuation of U.S. patent application Ser. No. 16/731,009 (now U.S. Pat. No. 11,038,688), entitled "TECHNIQUES TO CONTROL APPLETS FOR CONTACTLESS CARDS" filed on Dec. 30, 2019. The contents of the aforementioned application are incorporated herein by reference in their entirety.

BACKGROUND

Today credit card users can use their cards at merchants across the country and around the world. Card issuers continue to work tirelessly to provide enhancements and new features. However, one drawback of the current card technology is that they are not easily upgradable in a secure manner. Thus, when there is a problem with the card, or a new feature is available, card issuers typically issue a new card, and the old card is discarded. This approach is costly and may leave card users without a card while they are waiting for a new card.

SUMMARY

Various embodiments described herein may include a device, a system, an apparatus, and so forth including a near-field communication (NFC) interface, a network interface, a memory to store instructions, and processing circuitry, coupled with the memory, the NFC interface, and the network interface. The processing circuitry may be operable to execute the instructions, that when executed, cause the processing circuitry to establish, via the NFC interface, a communication link with a transaction card, send, via the NFC interface on the communication link, an indication of an attempt to execute an applet for the transaction card, wherein the applet is stored in memory of the transaction card, and receive, via the NFC interface on the communication link, a counter value associated with the applet. The processing circuitry, when executing the instructions, to send, via the network interface, a first message to a server, the first message comprising the counter value, and an identifier to identify the applet, receive, via the network interface, a second message from the server, the second message comprising an indication to permit the attempt to execute the applet or an indication to deny the attempt to execute the applet, and permit the attempt to execute the applet based on the indication to permit received in the second message or deny the attempt to execute the applet based on the indication to deny received in the second message.

Various embodiments may also include a device, system, an apparatus, and so forth including a network interface, a memory to store instructions, and processing circuitry, coupled with the memory and the network interface. The processing circuitry operable to execute the instructions, that when executed, cause the processing circuitry to receive, via the network interface, a first message from a client device, the first message comprising a counter value and an identifier to identify an applet, wherein the counter value is associated with the applet, and the counter value and applet are stored in memory of a transaction card, determine another counter value stored in storage, the other counter value associated with the transaction card, and compare the counter value and the another counter value to determine whether to permit or deny an attempt to execute the applet for the transaction card. Further, based on the comparison between the counter value and the other counter value, the processing circuitry to determine whether to permit or deny the attempt to execute the applet for the transaction card. The processing circuitry may also communicate a second message to the client device, comprising an indication to permit the attempt to execute the applet or an indication to deny the attempt to execute the applet.

BRIEF DESCRIPTION OF THE DRAWINGS

FIG. 2B is an illustration of a contact pad of the transaction card according to embodiments.

FIG. 4 illustrates an example of a first flow diagram.

FIG. 5 illustrates an example of a second flow diagram.

FIG. 7 illustrates an example of a computing architecture.

DETAILED DESCRIPTION

Figure 1A:
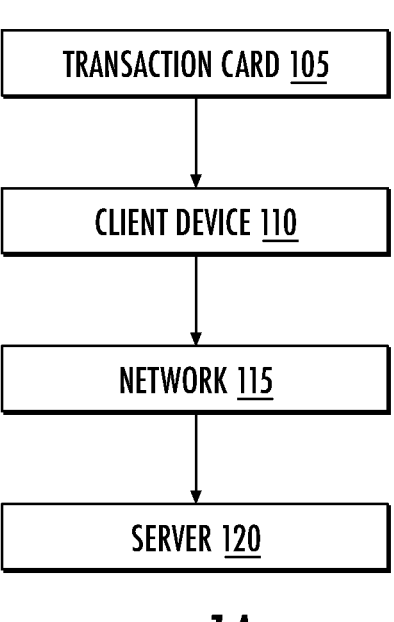
FIG. 1A is a diagram of a data transmission system.

Various embodiments are generally directed to systems, devices, techniques, and so forth to control applets for transaction cards. More specifically, embodiments include determining whether applets are enabled or disabled for transaction cards and permitting or denying execution of the applets for the transaction card based on whether they enabled or disabled.

For example, embodiments may include a device, such as a mobile device, a personal computer, a personal digital assistant, and the like configured to establish a communication link with a transaction card and detect an attempt to execute an applet for the transaction card. The device may communicate with the transaction card upon establishing the communication link including sending the transaction card an indication of an attempt to execute the applet. Further, the device may receive data from the transaction card data, the information may include a counter value associated with the applet and may be stored on the transaction card.

In embodiments, the device may further be communicatively coupled with one or more other systems, such as a banking system, including a server that may be utilized to determine whether the applet is enabled or disabled for the transaction card. For example, the device may send data to the server, including the counter value, and an identifier to identify the applet. The server may determine whether the applet is enabled or disabled based on a corresponding counter value for the applet stored in a data store. For example, the server may perform a comparison between the received counter value and a stored counter value to determine whether they match, or if one is greater than or less than the other. Based on the result of the comparison, the server may determine whether the applet is enabled or disabled, e.g., if they match or the stored counter value is less than the received value, the applet may be enabled. If the stored counter value is greater than the received counter value, the applet may be disabled. In some instances, the stored counter value may be set to a value such as NULL or"0000" that may indicate that the applet is disabled.

In embodiments, the server may send, and the device may receive data including an indication to permit the attempt to execute the applet or an indication to deny the attempt to execute the applet based on the result of the comparison, e.g., permit execution of the applet if it is enabled and deny execution if it is disabled. Embodiments are not limited in this manner.

Embodiments may also include systems, devices, and techniques to enable and disable applets for transaction cards. For example, a client device may determine to enable an applet for a transaction card, e.g., receive a user input or selection of the applet. The client device may further establish communication with the transaction card to communicate data, including determining a counter value associated with the applet.

In embodiments, the device may send data, including the counter value and an identifier of the applet to a banking system or server thereof. The server may utilize the data received from the device and set a corresponding counter value in a data store to the received counter value. The applet may then be enabled and for use on the transaction card.

In another example, the device may determine to disable an applet for the transaction, e.g., based on a user selection, a fraud detection, and so forth. The device may communicate data to the server, and the server may set a corresponding counter value in the data store to a value to disable the applet, e.g., NULL, "0000," and so forth. Embodiments are not limited to these examples, and further details are provided below.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates a system 100 according to an example embodiment. As further discussed below, system 100 may include transaction card 105, client device 110, network 115, and server 120. Although FIG. 1 illustrates single instances of the components; system 100 may include any number of components.

System 100 may include one or more transaction cards 105, which are further explained below with reference to FIGS. 2A-2B. In some embodiments, the transaction card 105 may communicate with devices, such as the client device 110 via various wired and wireless communication techniques, such as Near Field Communication (NFC) and Europay, Mastercard, and Visa (EMV). However, embodiments are not limited in this manner and may include communicating with devices via other techniques.

System 100 may include client device 110, which may be a network-enabled computer. In embodiments, the client device 110 may be a mobile device; for example, the mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. However, embodiments are not limited in this manner, the client device 110 may be another type of device, e.g., a communications device, a handheld personal computer (PC), a server, a network appliance, a PC, a workstation, a personal digital assistant, a thin client, a fat client, and so forth.

The client device 110 can include components including a processor and a memory, and it is understood that the processor may contain additional components, including processing circuitry, memories, error and parity/CRC checkers, data encoders, anti-collision algorithms, controllers, command decoders, security primitives, and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays (LCD), light-emitting diode displays, plasma panels, a touch-screen display, and so forth. The input devices may include any device for entering information into the user's device that is available and supported by the user's device, such as a touch-screen display, keyboard, mouse, cursor-control device, touch-screen, microphone, digital camera, video recorder or camcorder. These devices may be used to enter information and interact with the software and other devices described herein. For example, the client device 110 may include one or more components to enable users to perform one or more operations for applets on the transaction card 105, e.g., enable or disable.

In embodiments, the client device 110 may include one or more input/output (I/O) devices including those to communicate using wireless and wired technologies. For example, the client device 110 may include one or more transceivers to communicate in a cellular frequency band, e.g., a 700 Megahertz (MHz) frequency range, a 800 Megahertz (MHz) frequency range, a 850 MHz frequency range, a 1700 MHz frequency range, a 1900 MHz frequency range, a 2100 MHz frequency range, a 2300 MHz frequency range, a 2500 MHz frequency range, a 2600 MHz frequency range, and so forth. The transceiver itself may include components and circuitry to perform transmitting and receiving operations. The components and circuitry include analog-to-digital converters, digital-to-analog converters, modulators, amplifiers, and so forth. In embodiments, the transceiver may be coupled with one or more antennas to perform communications. Moreover, the transceiver may include and/or be coupled with the additional physical layer and Medium Access Control (MAC) layer circuitry and software to communicate in accordance with one or more cellular standards, such as the $2^{nd}$ generation (2G), 3G, 4G, and 5G or New Radio (NR) standards. Additional cellular standards and/or techniques include Enhanced Data rates for GSM Evolution (EDGE), Evolution-Data Optimized (EVDO), General Packet Radio Service (GPRS), High Speed Packet Access (HSPA), Evolved HSPA (HSPA+), Long-Term Evolution (LTE), Universal Mobile Telecommunications System (UMTS), Worldwide Interoperability for Microwave Access (WiMAX), etc. The transceiver may utilize one or more radio technologies and protocols (cellular protocols), e.g., Code-division multiple access (CDMA), frequency-division duplexing (FDD), time-division duplexing (TDD), multiple-input and multiple-output (MIMO), Orthogonal frequency-division multiple access (OFDMA), and so forth. Embodiments are not limited in this manner.

In embodiments, the client device 110 may include additional I/O devices, such as an NFC device coupled with an NFC antenna, e.g., a loop antenna. The NFC device may be a radio/controller operable to communicate in accordance with the NFC protocol and to employ electromagnetic induction via the NFC antenna. In one example, the NFC device may communicate in the unlicensed radio frequency Industrial, Scientific, and Medical (ISM) band of 13.56 MHz on International Organization for Standardization/International Electrotechnical Commission (ISO/IEC) 18000-3 air interface achieving data rates from 106 to 424 kilobits/second (kbit/s). As will be discussed in more detail below, the NFC device may be employed and provided via an application to communicate with another NFC enabled device, e.g., a transaction card 105.

In one example, the client device 110 includes an NFC device that may operate as an initiator, and the transaction card 105 may operate as a target. In this example, the client device 110 and the transaction card 105 may operate in a passive mode of operation. The client device 110 operating as the initiator energizes and provides a carrier field for the transaction card 105 operating as the target. The transaction card 105 draws its operating power from the initiator-provided electromagnetic field. In embodiments, the client device 110, including the NFC device, may continuously and periodically (or semi-periodically) search for a target, e.g., the transaction card 105. In embodiments, the client device 110 may communicate signals, including data with the transaction card 105 in accordance with the NFC protocol. For example, the client device 110 may communicate with the transaction card 105 to determine the status of applets of the transaction card 105. Embodiments are not limited in this manner.

In embodiments, the client device 110 may also include an EMV reader/writer capable of reading and writing to a transaction card 105 via an EMV protocol and standard. The EMV reader/writer may be used by the client device 110 to read and write from and to an integrated chip of the transaction card, for example. The EMV reader/writer may include one or more pads that may communicatively, physically, and electrically coupled with one or more pads of the transaction card 105. Once coupled, the client device 110 may utilize the EMV reader/writer to write data, information, applets, and so forth to the transaction card 105.

In some embodiments, a client device 110 of system 100 may also communicate with other components of system 100, including one or more servers 120. For example, a client device 110 may be in communication with one or more servers 120 via one or more networks 115 and may operate as a respective front-end to back-end pair with server 120. Client device 110 may transmit, for example from application or code executing on the client device 110, one or more requests to server 120. The one or more requests may be associated with retrieving data from server 120 and providing data to the server 120. For example, a server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

In some embodiments, the server 120 may be coupled with a data store to store data and information with respect to applets on transaction cards 105. The data store may be any type of data store, such as one or more databases stored on a local and/or remote storage system, a cloud-based data store system, and the like. In some instances, the client device 110 may communicate with the server 120 to determine whether one or more applet(s) of the transaction card 105 are enabled or disabled for execution. For example, the server 120 may receive data from the client device 110 about one or more applets 105 and based on information in the data store to determine whether an applet is enabled and disabled for the transaction card. The data received from the client device 110 may include information about the applet, e.g., an identifier of the applet and a counter value associated with the applet, which may be used by the server to perform the lookup and determine whether the applet is enabled or disabled, as will be discussed in more detail below in FIG. 1B.

In another example, the client device 110 may communicate with the server 120 to enable and/or disable one or more applets for the transaction card 105. For example, the client device 110 may receive a user input requesting an applet for a transaction card 105 to be enabled or disabled, and communicate the request to the server 120. The server 120 may perform one or more operations to enable/disable the applet, as will be discussed in more detail in FIG. 1C.

In embodiments, the one or more servers 120 may have additional components, such as one or more processors, which are coupled to the memory. A server 120 may be configured as a central system, server or platform to control and call various data at different times to execute a plurality of workflow actions. Server 120 may be configured to connect to the one or more databases. Server 120 may also be connected to at least one client device 110. Embodiments are not limited to these components, and a server 120 may include other components to perform the operations discussed herein.

System 100 may include one or more networks 115. In some examples, network 115 may be one or more of a wireless network, a wired network or any combination of wireless network and wired network, and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access-based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

Figure 1B:
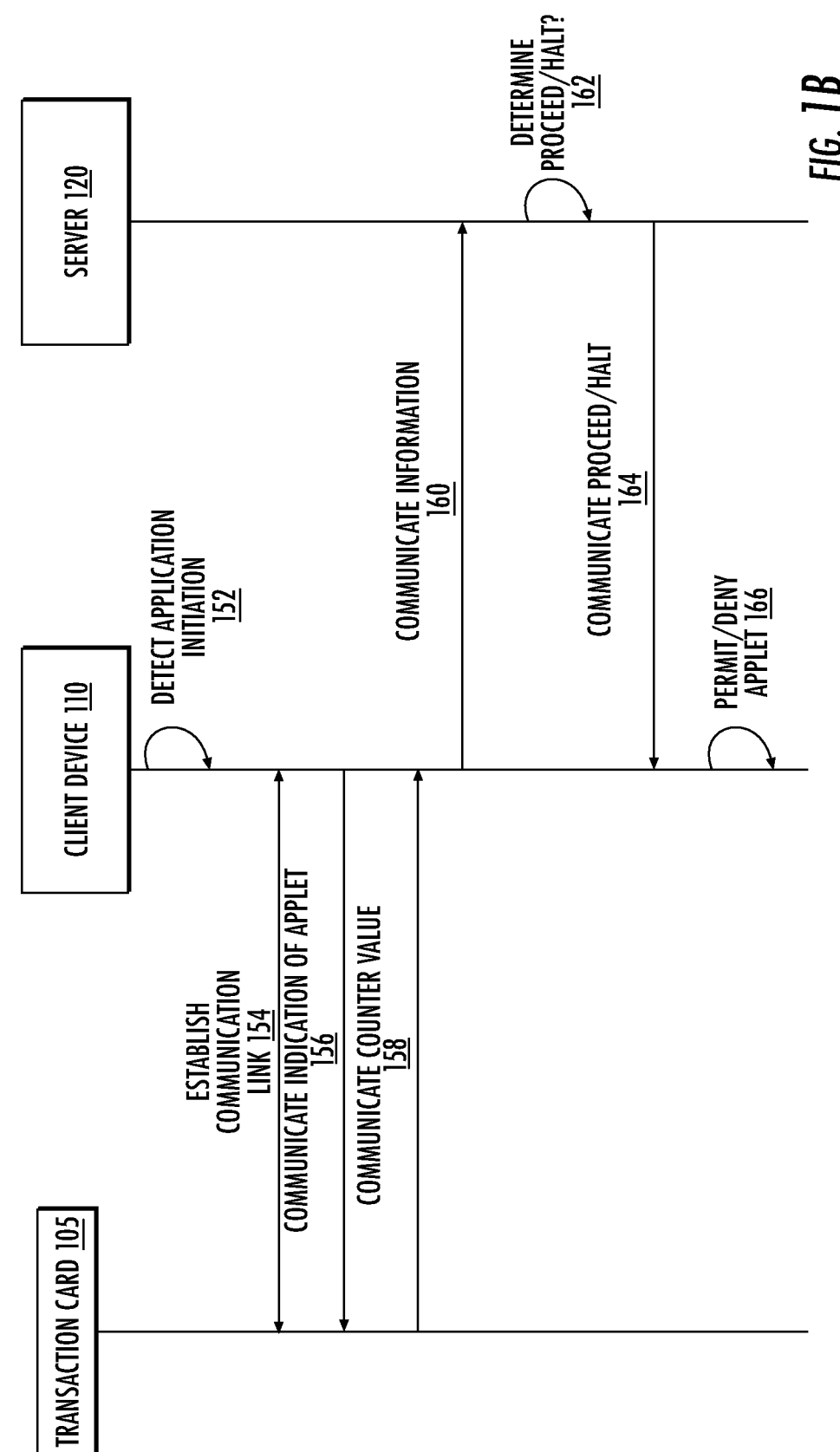
FIG. 1B illustrates an example of a communication flow for the data transmission system to determine whether an applet is enabled or disabled.

FIG. 1B illustrates an example communication flow 150 that may be performed by system 100 to determine whether an applet is enabled or disabled for a transaction card 105. The illustrated example includes a transaction card 105, a client device 110, and a server 120 for simplistic purposes. However, embodiments are not limited in this manner, and the systems discussed here likely include additional devices, components, apparatuses, etc. and still be consistent with embodiments discussed herein.

At step 152, the client device 110 may detect an attempt to execute an applet for the transaction card 105. For example, the client device 110 may include one or more applications, which may execute on the client device 110. The client device 110 may receive a request from a user via user input and/or an application to initiate an applet for the transaction card 105, and the applet may at least partially be stored on the transaction card 105. For example, an applet initiation may be caused by the transaction card 105 coming sufficiently close to the client device 110, e.g., the operating distance for NFC. In some instances, the client device 110 may include presenting a graphic in a graphical user interface (GUI) on a display to indicate to the user to bring the transaction card 105 close to the client device 110. In other instances, the initiation of the applet may occur automatically when the transaction card 105 is sufficiently close to the client device 110.

At step 154, the client device 110 may establish a communication link with the transaction card 105, which may be used to communicate data between the client device 110 and the transaction card 105. The client device 110 may perform one or more wireless exchanges with the transaction card 105 in accordance with the NFC protocol to establish the communication link. For example, the exchanges may include one or more verification and validation processes for the client device 110 and the transaction card 105. Embodiments are not limited in this manner.

At step 156, the client device 110 may send, via an NFC interface on the communication link, an indication of the attempt to execute an applet of the transaction card 105. In some embodiments, the indication to execute an applet on the transaction card 105 may be sent in applet select message and include an identifier identifying the applet, e.g., applet ID.

In embodiments, the applet may be a near field data exchange (NDEF) producing applet and the applet select message may be sent in accordance with an NFC Data Exchange Format. The applet may be stored in memory or storage of the transaction card 105 and may enable one or more functions or operations to be performed on the transaction card 105 and/or client device 110, e.g., executed by the circuitry of the transaction card 105 and/or circuitry of the client device 110. For example, the applet may cause an action to provide authentication capabilities to provide a single or multi-factor authentication, include a uniform resource indicator (URI) to cause one or more operations to performed on the client device 110, include a code snippet (executable code) to be executed by the transaction card 105 and/or the client device 110, and so forth. In some embodiments, the applet, when executed, may cause the processing circuitry of the client device 110 to perform at least one of launching a website in a web browser (pointed to by the URI), launching an application for execution (code snippet) by the processing circuitry, and causing communication with another device (pointed to by the URI), e.g., sending rewards data to a server identified in the URI and/or message to a server including instructions to update a rewards account.

In some embodiments, upon confirmation of the selection and communication of the applet select message, a sequence of select file messages followed by reading file messages may be transmitted between the transaction card 105 and the client device 110. For example, the client device 110 may send a sequence including "Select Capabilities file," "Read Capabilities file," and "Select NDEF file." In some embodiments, the applet may also be identified in at least one or more of the Select and Read messages, e.g., in the application ID field of the "Select NDEF file."

At step 158, the client device 110 may receive, via the NFC interface on the communication link, a counter value associated with the applet. In embodiments, the transaction card 105 may determine a counter value associated with the applet by performing a lookup based on the identifier in the applet select message or the "Select NDEF file" (Applet ID or application ID). In embodiments, the transaction card 105 may store one or more counter values in memory, each of the counter values may be associated with a particular applet and may be located by the circuitry of the transaction card 105 using the identifier. In embodiments, the counter value for an applet may be incremented for each message exchanged between the client device 110 and the transaction card 105 for the associated applet. As will be discussed in more detail, the counter value may be utilized to generate session keys based on masters keys to enable secure communication of data between the client device 110 and the transaction card 105 for the specific applet.

The transaction card 105 may generate a message, including a header and a shared secret. The shared secret may be any type of data to communicate to the client device 110, such as authentication information, account information, user information, and so forth. Further, a message authentication code (MAC) cryptogram may be created from the message, which may include the header and the shared secret. The MAC cryptogram may then be concatenated with one or more blocks of random data, and the MAC cryptogram and a random number (RND) may be encrypted with a session key. The session key may be generated by the transaction card 105 for a particular exchange session and may be generated from a master key, shared between the client device 110 and the transaction card 105, further encrypted based on the counter value for the applet.

Thereafter, the cryptogram and the header may be concatenated, and encoded as ASCII hex and returned in NDEF message format (responsive to the "Read NDEF file" message) to the client device and with the counter value. In some instances, the counter value may be transmitted to the client device 110 in plain text, and in other instances, the counter value may be encrypted. Further, the MAC cryptogram may be transmitted, by the transaction card 105, as an NDEF tag, included with a URI (e.g., as a formatted string), and/or with executable code.

In embodiments, the client device 110 may perform one or more communications with the server 120 and determine whether the applet is enabled or disabled for the transaction card 105. More specifically, at step 160, the client device 110 may send, via a network interface, one or more communications to the server 120, and the communications may include the counter value, and an identifier to identify the applet. The counter value may be the counter value received from the transaction card 105 and is associated with the applet. The identifier may be the applet ID or application ID previously sent to the transaction card 105 in the applet selection message of the "Select NDEF message." In some instances, the communications may be a single message communicated from the client device 110 to the server 120. However, in other instances, the communications may be two or more messages sent from the client device 110 to the server 120, e.g., the counter value and identifier may be sent in separate messages and/or include a number of communications with the server 120. Embodiments are not limited in this manner.

In embodiments, the client device 110 may communicate additional information with the counter value and the identifier. For example, the client device 110 may also send a user identifier, a device identifier, a transaction card identifier, a current date, a location, and so forth. The client device 110 may also encrypt the message and the data with an encryption key, which may be a session key for a particular session key or a shared master key known to the client device 110 and the server 120. These keys may be the same or different keys used to communicate data with the transaction card 105. Similarly, the client device 110 may sign the message, such that the server 120 can identify the source of the message. Thus, the data may be securely sent between the client device 110 and the server 120.

At step 162, the server 120 may determine whether to permit or deny the attempt to execute the applet based on whether the applet is enabled or disabled. For example, the server 120 may receive the message from the client device 110, and determine another corresponding counter value for the applet. More specifically, the server 120 may perform a lookup based on the identifier received in the message from the client device 110 to determine a corresponding counter value associated with the applet and stored in a data store. In some instances, the server 120 may use additional information, e.g., user identifying information (username), account identifying information (account number), transaction card identifying information (card number), and so forth. As mentioned, the data store may be a local or remote stored database and/or a cloud-based database; however, embodiments are not limited in this manner.

In embodiments, the server 120 compares the counter value received in the message from the client device 110 and from the transaction card 105 with other counter value retrieved from the data store associated with server 120. Based on the comparison between the counter value and other counter value, the server 120 may determine whether to permit or deny the attempt to execute the applet for the transaction card 105.

In one example, the server 120 may determine the applet is enabled for the transaction card 120 if the counter values match or if the counter value received from the client device 110 is greater than the counter value retrieved by the server 120. In embodiments, the counter value stored on the transaction card 105 and sent via the client device 110 may get out of sync with the counter value of the server 120, e.g., the transaction card's 105 counter value may be incremented without the server's 120 knowledge. Thus, the transaction card's 105 value may be greater than the counter value of the server 120 and still be valid. However, the counter value of the server 120 should never be larger than the counter value of the transaction card 105 unless the applet is disabled. Thus, if the counter value retrieved by the server 120 is greater than the counter value of the transaction card 105, the applet may be disabled. In some instances, the counter value may be set to a specific value to indicate that it's disabled. For example, the counter value of the server 120 may be set to NULL, "0000", or some other specific value to disable the applet.

In embodiments, if the server 120 determines that the applet is enabled at step 162, the server 120 may send communication including a message, via a network, to the client device 110 including an indication to permit the attempt to execute the applet of the transaction card 105 at step 164. If the server 120 determines the applet is disabled at step 162, the server 120 may send a message to the client device 110 including an indication to deny the attempt to execute applet for the transaction card 105 at step 164. The indication sent to the client device 110 may be a specific value, such as a binary '0' to indicate that the applet is disabled and a binary '1' to indicate that the applet is enabled. However, embodiments are not limited to this example and other values may be agreed upon to indicate the applet is disabled. Further and at step 166, the client device 110 may permit or deny the attempt to execute the applet based on the indication received from the server 120.

Figure 1C:
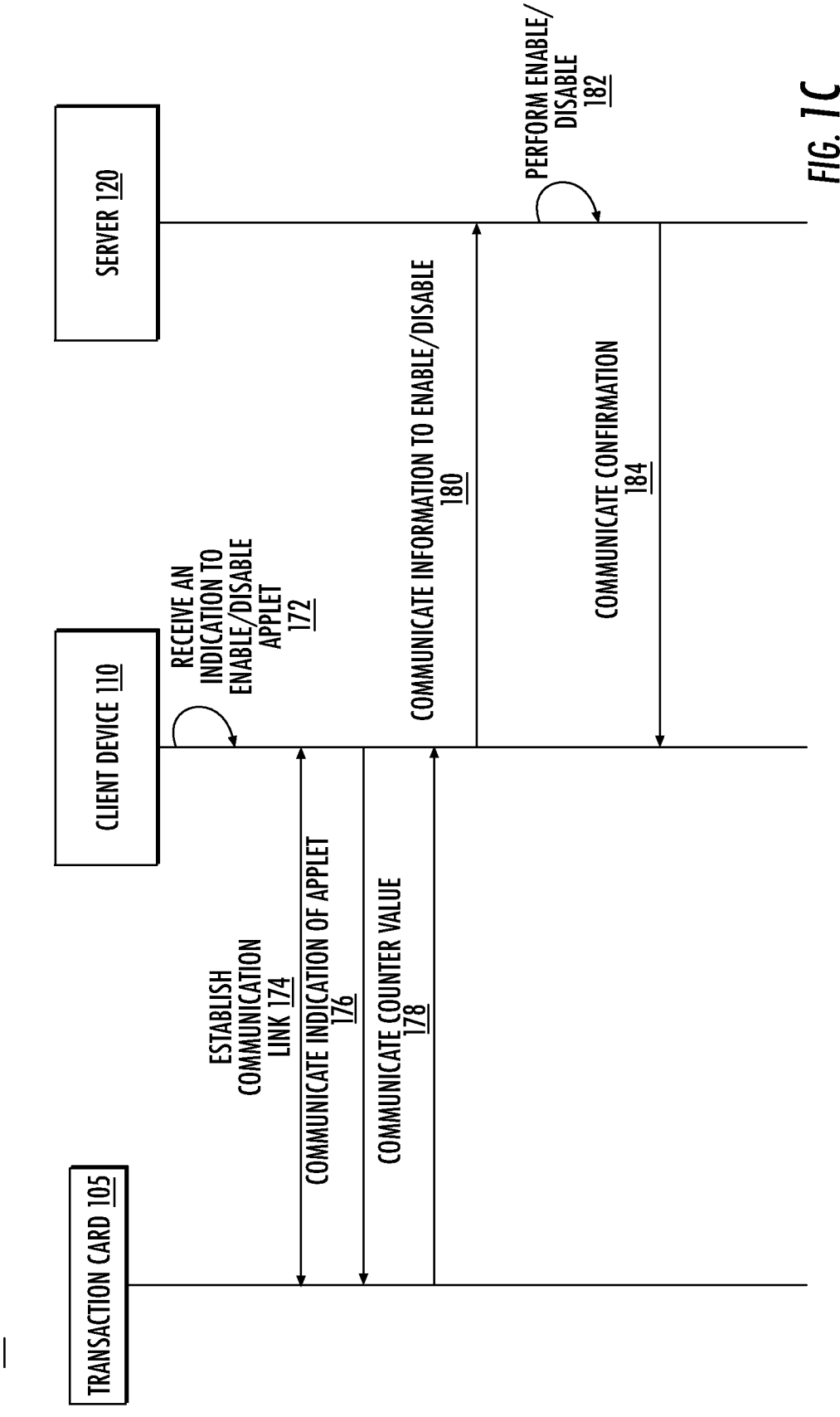
FIG. 1C illustrates an example of a communication flow for the data transaction system to enable/disable applets.

FIG. 1C illustrates an example of a communication flow 170 that may occur to enabled or disable an applet. In embodiments, one or more applets may be enabled or disabled by a user, an administrator, by a computing system, automatically based on one or more settings, and so forth. In one example, a user may utilize the client device 110 to enable and/or disable an applet for their transaction card 105. The illustrated example of FIG. 1C includes a transaction card 105, a client device 110, and a server 120 for simplistic purposes. However, embodiments are not limited in this manner, and the systems discussed here may include additional devices, components, apparatuses, etc. and are still be consistent with embodiments discussed herein.

At step 172, the client device 110 may receive an indication to enable an applet for the transaction card 105. For example, the client device 110 may receive a user input via an input device on the client device 110 indicating the selection to enable the applet. In some instances, the user input may be made via a touchscreen with a user interacting with one or more GUIs associated with an application to control and set settings for the transaction card 105, e.g., a banking application, a transaction card applet, a payment application, a website in a web browser, and so forth.

In some instances, the client device 110 may obtain a counter value associated with the applet from the transaction card 105 to ensure the server's 120 stored counter value is properly set by the server 120. At step 174, the client device 110 may establish a communication link with the transaction card 105. As similarly discussed above, the transaction card 105 and client device 110 may be brought sufficiently close to each other to send data via NFC communications. To establish the communication link, the client device 110 and the transaction card 105 may perform one or more verification and authentication processes.

At step 176, the client device 110 may communicate an identifier of the applet to the transaction 110. In embodiments, the identifier may be an Applet ID sent in an applet selection message or an application ID sent in a "Select NDEF file." The transaction card 105 may utilize the identifier to determine a counter value stored in memory for the applet. As discussed, each applet may be associated with a corresponding counter value stored in the memory of the transaction card 105 and be located by circuitry for the transaction card 105. However, in some instances, embodiments include a less granular approach and the transaction card 105 may only have a single counter value and each applet for the transaction card 105 may be controlled together, e.g. all enabled or all disabled by the single counter.

At step 178, the transaction card 105 may send the counter value to the client device 110. In embodiments, the counter value may be sent in plain text or encrypted form. Further, the counter value may be sent with a MAC cryptogram; however, embodiments are not limited in this manner, and in some instances, the counter value may be sent by itself in a message or communication.

At step 180, the client device 180 may communicate data to the server 120 to initiate enabling of the applet. For example, the client device 180, may send, via a networking interface, a message to the server 120, including the counter value and the identifier of the applet. The message may include additional information, including but not limited, a user identifier, a transaction card identifier, an account identifier, an indication of the selection to enable the applet, and so forth.

At step 182, the server 120 enables the applet for the transaction card 105. For example, server 120 may determine an associated counter value for the applet in a data store communicatively coupled with the server 120, the data store may be local, remote, cloud-based, and so forth. In embodiments, the server 120 may determine the associated counter value based on the identifier of the applet and one or more of user identifying information (username), account identifying information (account number), card identifying information (card number), and so forth. The server 120 may set the associated counter value to the counter value received from the client device 110. In some instances, the server 120 may set the associated counter value to a value less than the received counter value. At step 184, the server 120 may send a confirmation message to the client device 110, indicating that the applet was enabled successfully or if the enablement failed.

In some embodiments, a user may disable an applet for the transaction card 105. For example, at step 172, the client device 110 may receive an indication via a user input or selection via a touch screen interface. In instances when an applet is being disabled for the transaction card 105, the client device 110 may not communicate with the transaction card 105 to determine the counter value for the applet since, e.g., the counter value may not be needed to disable the applet. In these instances, the client device 110 may communicate directly with the server 120 an indication to disable the applet and the flow may go directly to step 180. As similar to above, the client device 110 may send additional information to the server 120 to disable the applet, e.g., user identifying information, account identifying information, card identifying information, and so forth.

To disable the applet, the server 120, at step 182, may perform a lookup to determine the location of the associated counter value and set the associated counter value to a NULL value or some other value ("00000000"). At step 184, the server 120 may communicate a confirmation indicating whether disabling the applet was successful or failed.

Communication flow 170 is one possible flow to enable and/or disable applets for a transaction card 105. However, embodiments are not limited in this manner. As previously mentioned, an administrator, such as a bank employee, a credit employee, a card management employee, or anyone that is permitted access to the financial information of the user may enable and/or disable an applet for the transaction card 105. For example, an administrator may interface with the server 120 via an application, such as a banking application, or through a website in a web browser to enable or disable an applet for the transaction card 105. Permitting an administrator or banking employee to configure an applet may be convenient for a card user that calls into a phone system or is in-person at a banking office.

In some instances, an applet may be disabled and/or enabled automatically by a computer-based system. For example, the server 120 may be coupled with and in communication with a fraud detecting system configured to detect security breaches and/or fraud attempts. The server 120 may receive an indication from the fraud detecting system indicating that a breach and/or a fraud attempt may have occurred. The indication may include information to identify accounts affected by the breach or fraud. The server 120 may utilize the identifying information to set counter values to disable the applets in the data store of the server 120 for the affected transaction cards. In another example, the server 120 may be coupled with and/or part of a banking system, and the banking system may determine to enable one or more applets for the first time. In this example, the server 120 may set the associated counter value to initiation value (one or zero). The initiation value may the same as an initiation value set for transaction card at the time of manufacture. In other words, transaction cards may be configured with applets disabled and a later they may be enabled for use by the user. Embodiments are not limited in this manner.

Figure 2A:
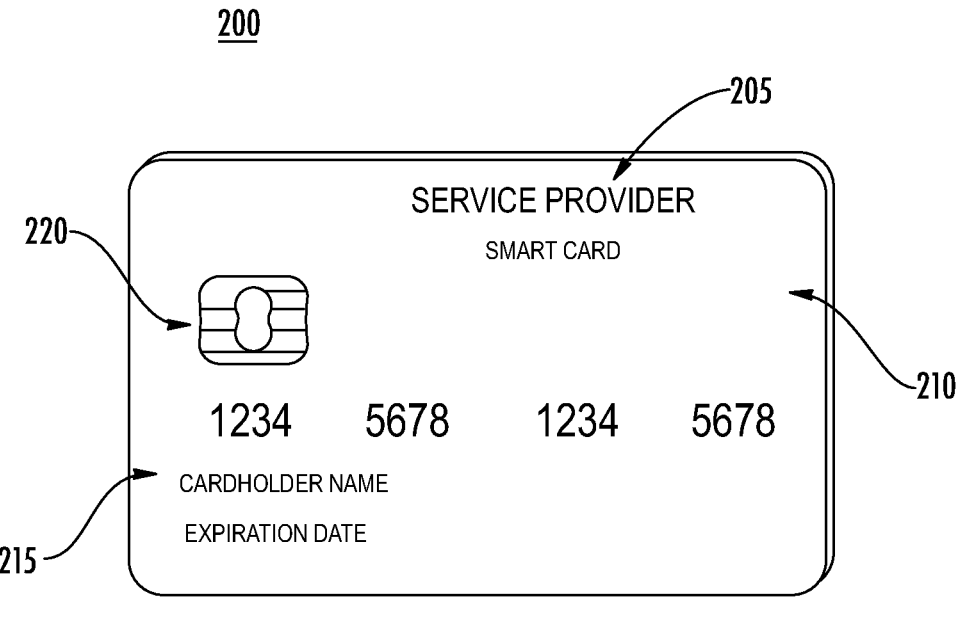
FIG. 2A is an illustration of a transaction card according embodiments.

FIG. 2A illustrates an example configuration of a transaction card 200, which may include a contactless card, a payment card, such as a credit card, debit card, or gift card, issued by a service provider as displayed as service provider indicia 205 on the front or back of the card 200. In some examples, the transaction card 200 is not related to a payment card, and may include, without limitation, an identification card. In some examples, the transaction card may include a dual interface contactless payment card, a rewards card, and so forth. The transaction card 200 may include a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the transaction card 200 may have physical characteristics compliant with the ID-1 format of the ISO/IEC 7816 standard, and the transaction card may otherwise be compliant with the ISO/IEC 14443 standard. However, it is understood that the transaction card 200, according to the present disclosure may have different characteristics, and the present disclosure does not require a transaction card to be implemented in a payment card.

The transaction card 200 may also include identification information 215 displayed on the front and/or back of the card, and a contact pad 220. The contact pad 220 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The transaction card 200 may also include processing circuitry, antenna, and other components as will be further discussed in FIG. 2B. These components may be located behind the contact pad 220 or elsewhere on the substrate 210, e.g., within a different layer of the substrate 210. The transaction card 200 may also include a magnetic strip or tape, which may be located on the back of the card (not shown in FIG. 2A). The transaction card 210 may also include an NFC device coupled with an antenna capable of communicating via the NFC protocol. Embodiments are not limited in this manner.

As illustrated in FIG. 2B, the contact pad 220 may include or be coupled with an integrated chip 225 for storing and processing information, including a microprocessor 230 including processing circuitry, and memory 235. It is understood that the integrated chip 225 may contain additional components, including processors, memories, error and parity/CRC checkers, data encoders, anticollision algorithms, controllers, command decoders, security primitives, and tamper-proofing hardware, as necessary to perform the functions described herein. Although illustrated as part of or behind the contact pad 220, embodiments are not limited in this manner. In some instances, the integrated may be located in a different location of the transaction card 200 and be coupled with the contact pad 220 via one or more traces or interconnects to enable communication via EMV.

The memory 235 may be any type of memory including, but not limited to, read-only memory, write-once read-multiple memory or read/write memory, e.g., RAM, ROM, and EEPROM, and the transaction card 200 may include one or more of these memories. In some instances, the transaction card 200 may include more than one type of memory and may include encrypted and unencrypted capable memory. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 235 may be configured to store data, including one or more applets 240, one or more counters 245, and a customer identifier 250. The one or more applets 240 may include one or more software applications configured to execute on one or more transaction cards, such as Java Card applet. However, it is understood that applets 240 are not limited to Java Card applets, and instead may be any software application operable on transaction cards or other devices having limited memory. In some embodiments, the applet may cause the processing circuitry of a client device to perform at least one of launching a website in a web browser (pointed to by the URI), launching an application for execution (code snippet) by the processing circuitry, and causing communication with another device (pointed to by the URI), e.g., sending rewards data to a server identified in the URI and/or message to a server including instructions to update a rewards account.

The one or more counter values 245 may include a numeric counter sufficient to store an integer. In embodiments, each of the one or more counter values 245 may be associated with and/or for a particular applet 240. Thus, each applet 240 has its' own counter value 245. In embodiments, a counter value 245 may be incremented each time a device, such as a client device 110, communicates with the transaction card 205 with respect to an associated applet. As discussed, the counter value may be retrieved and sent to a client device to determine whether the associated applet is enabled or disabled. The counter value may also be utilized to generate session keys based on a master key distributed and stored with the transaction card 200, e.g., in memory 235 (not shown). In some instances, the transaction card 200 may include a single counter value stored in memory 235, which may be used to control and be available for each of the applets 240 on the transaction card 200. For example, all of the applets may be enabled and/or disabled by setting an associated counter value stored in a data store to appropriate value, e.g., NULL to disable the applets and a matching value to enable the applets.

The customer identifier 250 may include a unique alphanumeric identifier assigned to a user of the transaction card 200, and the identifier may distinguish the user of the transaction card from other transaction card users. In some examples, the customer identifier 250 may identify both a customer and an account assigned to that customer and may further identify the transaction card associated with the customer's account. In some instances, the customer identifier 250 may be provided to a client device and a server to determine whether an applet is enabled or disabled.

In embodiments, the memory 235 may store one or more keys (not shown), e.g., one or more master keys. Each key may be part of a key pair that may be used to encrypt and decrypt data, such as previously discussed to send a MAC cryptogram. As mentioned, a key may be encrypted based on a counter value and used as a session key to communicate data securely for an applet during a session.

In embodiments, the transaction card 200 may also include an NFC device 260 capable of communicating in accordance with an NFC protocol. The NFC device 260 may operate passively and may be energized by a signal emitted by an NFC device of the client device. The NFC device 260 may draw its power from the electromagnetic field caused by the NFC device of the client device, for example. However, embodiments are not limited in this manner. In another example, the transaction card 200 may be provided with a power source (not shown) operable to supply power to the NFC device 260 such that it can activate its own electromagnetic field. In one example and as previously discussed, the transaction card 200 may provide status updates and communicate data with an ATM or client device via the NFC device. Embodiments are not limited in this manner, and the transaction card 200 may communicate other data with other devices.

In some examples, the transaction card 200 may include one or more antennas 255. The one or more antennas 255 may be placed within the transaction card 200 and around the integrated chip 225 and the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225. In embodiments, the one or more antennas 255 may be coupled with the NFC device 260 and be configured to enable NFC communication.

In an embodiment, the antenna 255 including a coil of transaction card 200, may act as the secondary of an air-core transformer. For example, the ATM may communicate with the transaction card 200 by cutting power or amplitude modulation. The transaction card 200 may infer the data transmitted from the ATM using the gaps in the transaction card's power connection, which may be functionally maintained through one or more capacitors. The transaction card 200 may communicate back by switching a load on the transaction card's coil or load modulation. Load modulation may be detected in the terminal's coil through interference.

Figure 3:
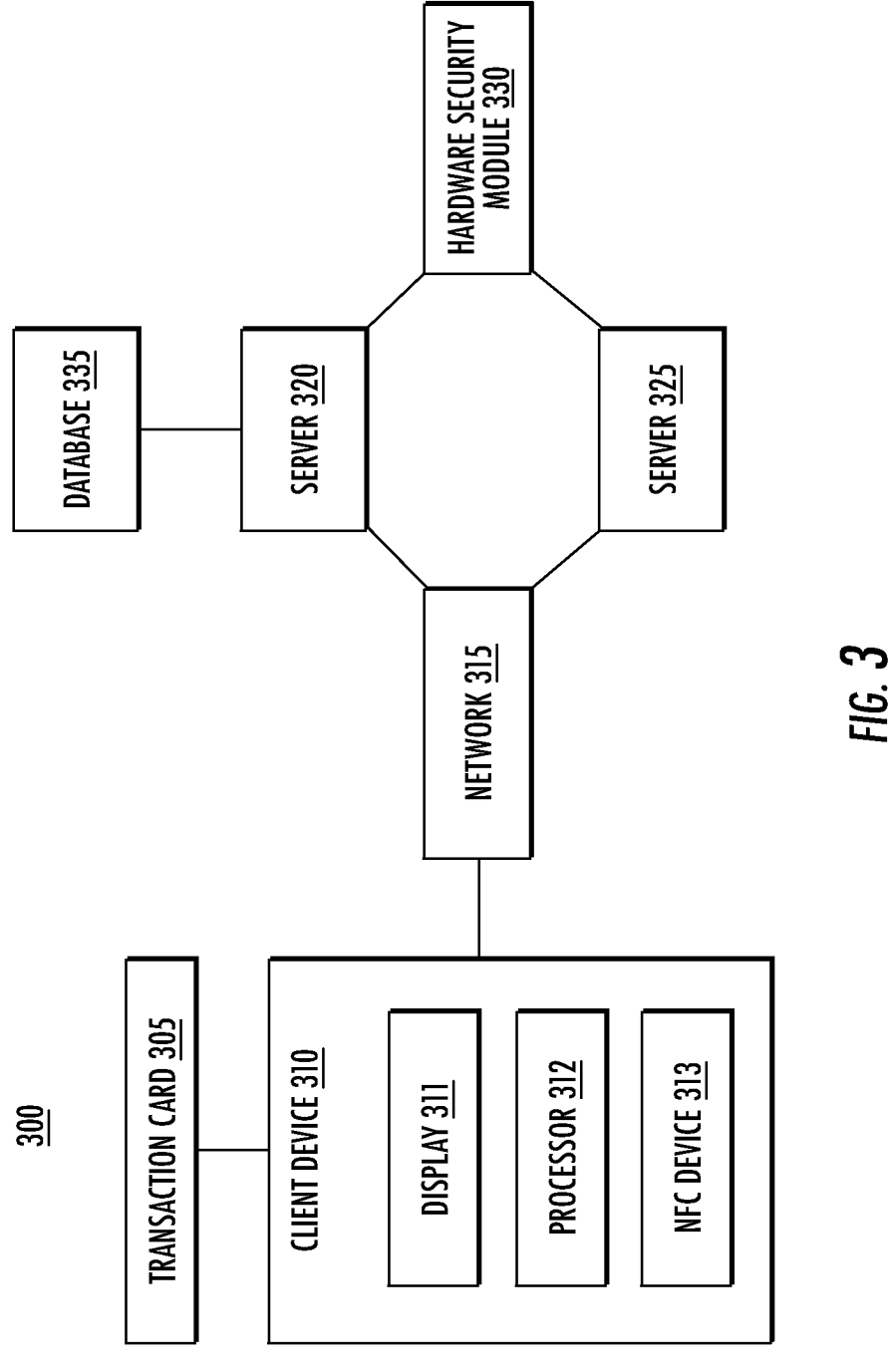
FIG. 3 is an example of a system in accordance with embodiments discussed herein.

FIG. 3 illustrates a system 300 including a client device 310, such as a mobile device, capable of performing operations to maintain applets foron transaction card(s) 305. System 300 illustrates a client device 310 having a number of components capable of coupling and communicating with a transaction card 305 and other servers 320. The components of the client device 310 include a display 311, a processor 312, an NFC device 313. In embodiments, the client device 310 may include additional components not shown, such as an EMV device, one or more interfaces, memory, and so forth, and embodiments are not limited in this manner. FIG. 3A illustrates a limited number of components for illustrative purposes only.

Client device 310 may be in communication with one or more servers 320 via one or more networks 315, which may be wired and/or wireless networks. Client device 310 may transmit, a networking interface of client device 310, data to the server 320. In one example, the client device 310 may send requests associated with retrieving data and information from one or more servers 320 and database 335. For example, a server 320 may receive the one or more requests from a client device 310 and process the requests. Based on the one or more requests from client device 310, a server 320 may be configured to retrieve the requested data from one or more databases 335, for example. In embodiments, the client device 310 may send data to the server 320 via network 315. The data may include information concerning the user's account, account number, enter a pin, an operation to be performed, and so forth.

In some instances, the client device 310 may communicate information to determine whether an applet from the transaction card 305 is enabled or disabled before permitting the applet to proceed with the execution. The transaction card 305 may perform a determination, based on the information from the client device 310, to determine a counter value associated applet and stored in database 335. As previously mentioned, the server 320 may utilize the identifier of the applet and one or other identifiers, e.g., user identifying information, account identifying information, card identifying information, unique customer identifier, and so forth, to determine the counter value in the database. Based on a result of a comparison of the counter value received from the client device 310 and the counter value stored in the database 335, the server 320 may determine whether the applet is enabled or disabled. Further, the server 320 may communicate a result or an indication of the result to the client device 310 via network 315.

The client device 310 may communicate with the server 320 via network 315 to enable and disable applets for a transaction card 305. For example, the server 320 may receive an indication from the client device 310 via a network 315 to disable an applet for the transaction card 305. The server 320 may set a counter value associated with the applet to a value, e.g., NULL, to disable the applet in the database 335. Similarly, the server 320 may receive a counter value from the client device 310 and set the counter value in the database 335 to the received counter value.

In embodiments, the client device 310 may include a processor 312, which may be coupled with other components including the memory. The processor 312 may be any type of processor and including circuitry, cache, control unit, logic, registers, clock(s), buses, and so forth. Further, the memory may be any type of memory. In embodiments, the memory may store one or more applications or software including instructions that may be executed by the processor 312 and the processing circuitry. The software may include instructions to perform operations discussed herein, e.g., perform transaction operations and transaction card management operations.

In embodiments, the client device 310 may communicate one or more interfaces capable of communicating with the transaction card 305. In one example, the client device 310 includes an NFC device 313 capable of communicating with the transaction card 305 using short-range wireless communication (e.g., NFC). As should be noted, those skilled in the art would understand that a distance of fewer than twenty centimeters is consistent with NFC range. When the transaction card 305 is proximate to the client device 310, the NFC device 313 may read data stored on the card, such as a status of applets. In one example, the NFC device 313 may perform one or more actions or communications with the transaction card 305, such as detecting the transaction card 305 including the card's NFC device, authenticating the card, polling the card for the status of the applets, and receiving the status. In some instances, the NFC device 313 may be enabled to energize and provide power to the NFC device of the transaction card 305, as previously discussed above. In other instances, the transaction card 305 may provide its' own power for the NFC device.

FIG. 4 illustrates an example of a logic flow 400 that may be representative of some or all the operations executed by one or more embodiments described herein. For example, the logic flow 400 may illustrate operations performed by a client device to determine whether an applet is enabled or disabled.

At block 410, the logic flow 400 includes establishing a communication link with a transaction card. For example, the client device may establish the communication link with the transaction card by communicating one or more messages with the transaction card in accordance with the NFC protocol to perform verification and/or validation operations between the devices. The communication link may be utilized by the client device and/or transaction card to communicate data.

At block 420, the logic flow 400 includes sending an indication of an attempt to execute an applet for the transaction card, wherein the applet is stored in the memory of the transaction card. In embodiments, the indication may be sent as an applet select message and/or a "Select NDEF file" message to the transaction card and include an identifier of the applet.

At block 430, the logic flow 400 includes receiving, by the client device, the counter value associated with the applet. The counter value may be received with a MAC cryptogram or in the separate message and may be in plain text or encrypted. The counter value is associated with the applet and may indicate an approximate number of communications the transaction card conducted for the applet.

At block 440, the logic flow 400 includes sending, by the client device, the first message to a server, the first message may include the counter value, and an identifier to identify the applet. In some instances, the client device may send additional information related to the applet, such as user identifying information, account identifying information, card identifying information, the unique customer identifier, and so forth. In other instances, the server may determine the additional information separately, performing an information lookup based on identity of the client device sending the message. The counter value, the identifier of the applet, and other information may be used by a system including a server to determine if the applet is enabled or disabled in the system.

At block 450, the logic flow 400 includes receiving, by the client device, a second message from the server, the second message may include an indication to permit the attempt to execute the applet or an indication to deny the attempt to execute the applet. Further and at block 460, the logic flow 440 includes permitting, by the client device, the attempt to execute the applet based on the indication to permit received in the second message or denying, by the client device, the attempt to execute the applet based on the indication to deny received in the second message.

FIG. 5 illustrates an example of a logic flow 500 that may be representative of some or all the operations executed by one or more embodiments described herein. For example, the logic flow 500 may illustrate operations performed by a server to determine whether an applet is enabled or disabled and communicate with a client device.

At block 510, the logic flow 500 includes receiving, by the server, a message from a client device. In embodiments, the message includes a counter value and an identifier to identify an applet, and the counter value is associated with the applet. In some embodiments, the server may receive additional information from the client device, e.g., user identification, account identification, card identification, a unique customer identifier, and so forth. However, embodiments are not limited in this manner.

At block 520, the logic flow 500 includes determining, by the server, another counter value stored in storage, the other counter value associated with the transaction card and the applet. For example, the server 500 may use the information received from the client device to retrieve the other counter value from a data store, e.g., perform a lookup in a database.

At block 530, the logic flow 500 includes comparing the counter value from the client device and another counter value retrieved from the data store to determine whether to permit or deny an attempt to execute the applet for the transaction card. The result of the comparison may indicate whether the counter value received from the client device matches, is less than, or is greater than the other counter value. Based on the comparison, the server may determine whether the applet is enabled or disabled. More specifically and at block 540, the logic flow 500 includes determining whether to permit or deny the attempt to execute the applet for the transaction card based on the comparison. For example, the applet may be permitted if the counter value received from the client device matches or is greater than the stored counter value. The applet may be prohibited if the counter value received is less than the stored counter value or the stored counter value is set to a NULL or another disabled indicating value.

At block 560, the logic flow 500 includes communicating, by the server, a second message to the client device. The second message includes an indication to permit the attempt to execute the applet or an indication to deny the attempt to execute the applet.

Figure 6:
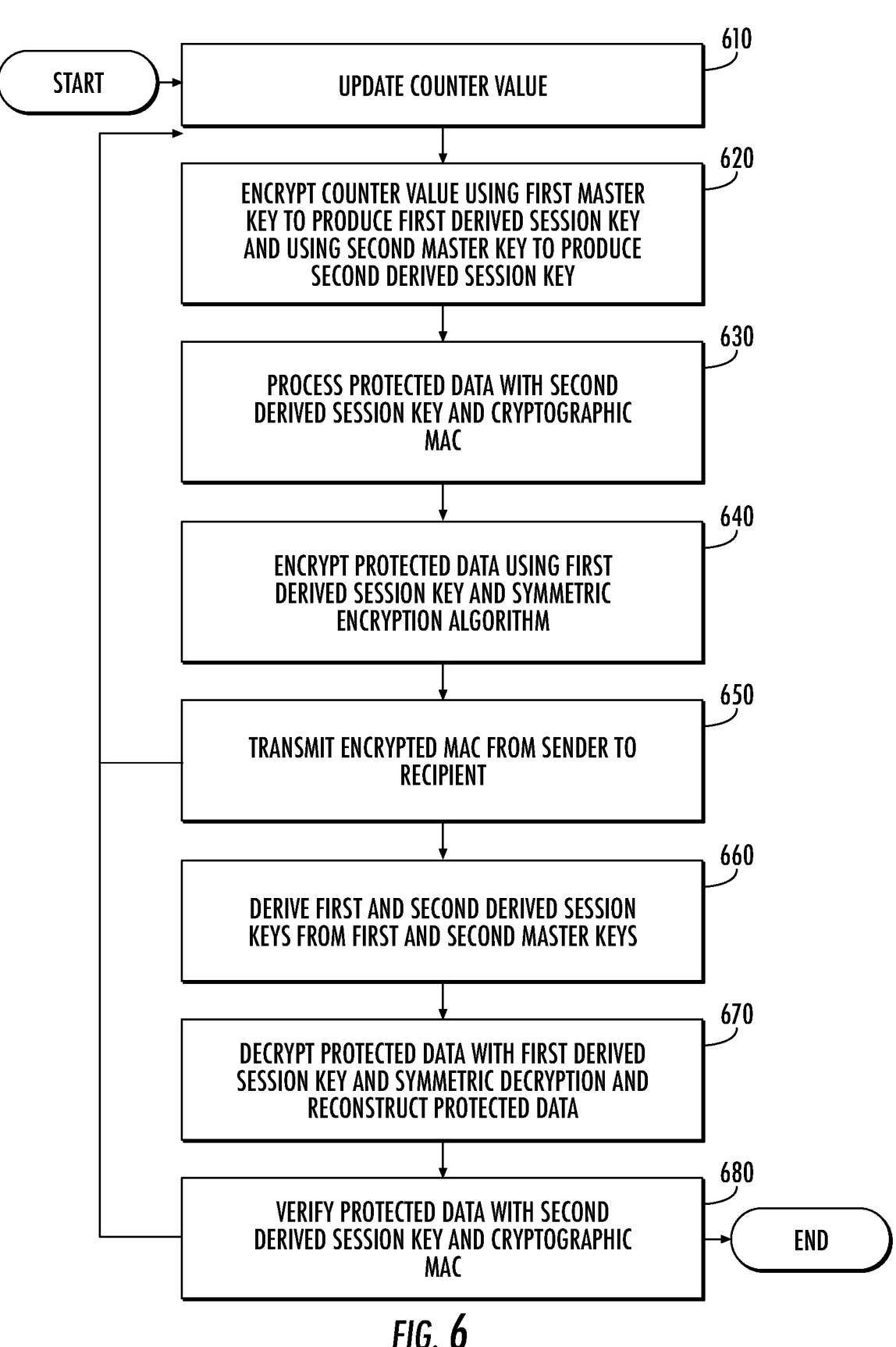
FIG. 6 illustrates an example of a third flow diagram.

FIG. 6 depicts an exemplary process 600 illustrating key diversification according to one example. Initially, a sender, e.g., transaction card, and the recipient, e.g., client device, may be provisioned with two different master keys. For example, a first master key may comprise the data encryption master key, and a second master key may comprise the data integrity master key. The sender has a counter value, which may be updated at block 610, and other data, such as data to be protected, which it may secure share with the recipient.

At block 620, the counter value may be encrypted by the sender using the data encryption master key to produce the data encryption derived session key, and the counter value may also be encrypted by the sender using the data integrity master key to produce the data integrity derived session key, e.g., a session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 630, the data to be protected is processed with a cryptographic MAC operation by the sender using the data integrity session key and a cryptographic MAC algorithm. The protected data, including plaintext and shared secret, may be used to produce a MAC cryptogram using one of the session keys (AUT-Session-Key).

At block 640, the data to be protected may be encrypted by the sender using the data encryption derived session key in conjunction with a symmetric encryption algorithm. In some examples, the MAC cryptogram is combined with an equal amount of random data, for example each 8 bytes long, and then encrypted using the second session key (DEK-Session-Key).

At block 650, the encrypted MAC cryptogram is transmitted, from the sender to the recipient, with sufficient information to identify additional secret information (such as shared secret, master keys, etc.), for verification of the cryptogram.

At block 660, the recipient uses the received counter value to independently derive the two derived session keys from the two master keys as explained above.

At block 670, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 680, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and the recipient (e.g., the receiving device), it may be trusted that the contactless card which created the MAC and encrypted the MAC is indeed authentic. Moreover, the counter value used to derive the first and second session keys may be shown to be valid and may be used to perform authentication operations.

After that, the two derived session keys may be discarded, and the next iteration of data exchange will update the counter value (returning to block 610), and a new set of session keys may be created (at block 620). In some examples, the combined random data may be discarded.

FIG. 7 illustrates an embodiment of an exemplary computing architecture 700 suitable for implementing various embodiments as previously described. In one embodiment, the computing architecture 700 may include or be implemented as part of system 100.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 700.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environ- ment using logical connections via wire and/or wireless communications to one or more remote computers, such as a remote computer 748. The remote computer 748 can be a workstation, a server computer, a router, a personal com- puter, portable computer, microprocessor-based entertain- ment appliance, a peer device or other common network node, and typically includes many or all the elements described relative to the computer 702, although, for pur- poses of brevity, only a memory/storage device 750 is illustrated. The logical connections depicted include wire/ wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the com- puter 702 is connected to the LAN 752 through a wire and/or wireless communication network interface or adaptor 756. The adaptor 756 can facilitate wire and/or wireless commu- nications to the LAN 752, which may also include a wireless access point disposed thereon for communicating with the wireless functionality of the adaptor 757.

When used in a WAN networking environment, the com- puter 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communica- tions link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless tech- nologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 702.3-related media and func- tions).

The various elements of the devices as previously described with reference to FIGS. 1A-6 may include various hardware elements, software elements, or a combination of both. Examples of hardware elements may include devices, logic devices, components, processors, microprocessors, cir- cuits, processors, circuit elements (e.g., transistors, resistors, capacitors, inductors, and so forth), integrated circuits, application specific integrated circuits (ASIC), program- mable logic devices (PLD), digital signal processors (DSP), field programmable gate array (FPGA), memory units, logic gates, registers, semiconductor device, chips, microchips, chip sets, and so forth. Examples of software elements may include software components, programs, applications, com- puter programs, application programs, system programs, software development programs, machine programs, oper- ating system software, middleware, firmware, software modules, routines, subroutines, functions, methods, proce- dures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

What is claimed is:

1. A non-transitory computer-readable storage medium storing computer-readable program code executable by a processor, wherein execution of the computer-readable pro- gram code causes the processor to:

receive, via a network interface, from a computing device, a communication to disable an applet stored on a contactless card, the communication comprising a counter value that is stored by the contactless card, encrypted data, and an applet identifier to identify the applet, the encrypted data comprising a combination of one or more blocks of random data and enciphered data, wherein the counter value is associated with the applet, wherein the computing device comprises one of a client device, an automatic teller machine (ATM), or a web-based application of a personal computer;

decrypt the encrypted data to determine the enciphered data;

validate the counter value based on the enciphered data;

determine a second counter value associated with the applet, the second counter value stored in a data store comprising a plurality of counter values, each respec- tive counter value associated with a respective one of a plurality of applets, wherein the plurality of applets includes the applet, wherein the data store is commu- nicatively coupled with the processor;

set the second counter value in the data store to a value to disable the applet for the contactless card; and send a second communication to the one of the client device, the ATM, or the web-based application to indicate the applet is disabled.

2. The computer-readable storage medium of claim 1, the processor to set the value of the second counter value in the data store to a null value to disable the applet.

3. The computer-readable storage medium of claim 1, the processor to set the value of the second counter value in the data store to a number greater than the counter value received in the communication to disable the applet.

4. The computer-readable storage medium of claim 1, the processor to set the value of the second counter value in the data store to a specified value to disable the applet.

5. The computer-readable storage medium of claim 1, the processor to receive in the communication an identifier to identify an account associated with the contactless card, perform a lookup in the data store based on the identifier to determine the second counter value associated with the applet, and retrieve the second counter value from the plurality of counter values stored in the data store.

6. The computer-readable storage medium of claim 1, the processor to determine the applet is enabled for the contactless card prior to setting the second counter value to a null value, a number greater than the counter value, or a specified value to disable the applet.

7. The computer-readable storage medium of claim 6, the processor to determine the counter value matches the second counter value based on a comparison to determine the applet is enabled.

8. The computer-readable storage medium of claim 6, the processor to determine the counter value is greater than the second counter value based on a comparison to determine the applet is enabled, wherein the plurality of counter values are initially set at a time of manufacture.

9. A non-transitory computer-readable storage medium storing computer-readable program code executable by a processor, wherein execution of the computer-readable program code causes the processor to:

receive, via a network interface, from a computing device, a communication to enable an applet stored on a contactless card, the communication comprising a counter value stored on the contactless card, encrypted data, and an applet identifier to identify the applet, the encrypted data comprising a combination of a random number and encoded data wherein the counter value is associated with the applet, wherein the computing device comprises one of a client device, an automatic teller machine (ATM), or a web-based application of a personal computer;

decrypt the encrypted data to determine the encoded data;

validate the counter value based on the encoded data;

determine a second counter value associated with the applet, the second counter value stored in a data store comprising a plurality of counter values, each respective counter value associated with a respective one of a plurality of applets, wherein the plurality of applets includes the applet, wherein the data store is communicatively coupled with the processor;

set the second counter value in the data store to a value to enable the applet for the contactless card; and send a second communication to the one of the client device, the ATM, or the web-based application to indicate the applet is enabled.

10. The computer-readable storage medium of claim 9, the processor to set the value of the second counter value in the data store to the counter value to enable the applet.

11. The computer-readable storage medium of claim 9, the processor to set the value of the second counter value in the data store to a number less than the counter value received in the communication to enable the applet.

12. The computer-readable storage medium of claim 9, the processor to receive in the communication an identifier to identify an account associated with the contactless card, perform a lookup in the data store based on the identifier to determine the second counter value associated with the applet, and retrieve the second counter value from the plurality of counter values stored in the data store.

13. The computer-readable storage medium of claim 9, the processor to determine the applet is disabled for the contactless card prior to setting the value to the counter value, or a number less than the counter value to enable the applet.

14. The computer-readable storage medium of claim 13, the processor to determine the second counter value is set to a null value to determine the applet is disabled.

15. The computer-readable storage medium of claim 13, the processor to determine the counter value is less than the second counter value or greater than the second counter value to determine whether the applet is enabled.

16. A method, comprising:

receiving, by a server, from a mobile device, a communication to enable an applet for use to perform transactions, the applet stored and executable on a contactless card, the communication comprising a counter value stored on the contactless card, an encoded encrypted data, and an applet identifier to identify the applet, the encoded encrypted data comprising an encoded combination of a random number and encrypted data, wherein the counter value is associated with the applet, wherein the mobile device comprises one of a client device, an automatic teller machine (ATM), or a web-based application of a personal computer;

decrypting the encoded encrypted data to determine the encrypted data;

validating the counter value based on the encrypted data;

determining, by the server, a corresponding counter value associated with the applet based on information received in the communication, the corresponding counter value stored in a data store, wherein the data store is communicatively coupled with the server;

setting, by the server, the corresponding counter value in the data store to a value to enable the applet for the contactless card; and send a second communication to the one of the client device, the ATM, or the web-based application to indicate the applet is enabled.

17. The method of claim 16, comprising determining the corresponding counter value is set to a null value to determine the applet is disabled.

18. The method of claim 16, comprising determining the counter value is less than the corresponding counter value or greater than the corresponding counter value to determine whether the applet is enabled.

19. The method of claim 16, comprising setting the value of the corresponding counter value in the data store to the counter value to enable the applet.

20. The method of claim 16, comprising setting the value of the corresponding counter value in the data store to a number less than the counter value received in the communication to enable the applet.

* * * * *